(No Model.) 2 Sheets—Sheet 2.

M. L. ROTHSCHILD.
AIR BRAKE SYSTEM.

No. 515,617. Patented Feb. 27, 1894.

WITNESSES
INVENTOR
Moses L. Rothschild
Geo H Lothrop atty.

UNITED STATES PATENT OFFICE.

MOSES L. ROTHSCHILD, OF CHICAGO, ILLINOIS, ASSIGNOR TO THE GENETT AIR BRAKE COMPANY, OF ILLINOIS.

AIR-BRAKE SYSTEM.

SPECIFICATION forming part of Letters Patent No. 515,617, dated February 27, 1894.

Application filed December 6, 1892. Serial No. 454,279. (No model.)

*To all whom it may concern:*

Be it known that I, MOSES L. ROTHSCHILD, of Chicago, in the county of Cook and State of Illinois, have invented a new and useful Improvement in Air-Brake Systems for Cars, of which the following is a specification.

My invention consists in an improvement in air brake systems for cars, hereinafter fully described and claimed.

Figure 1:
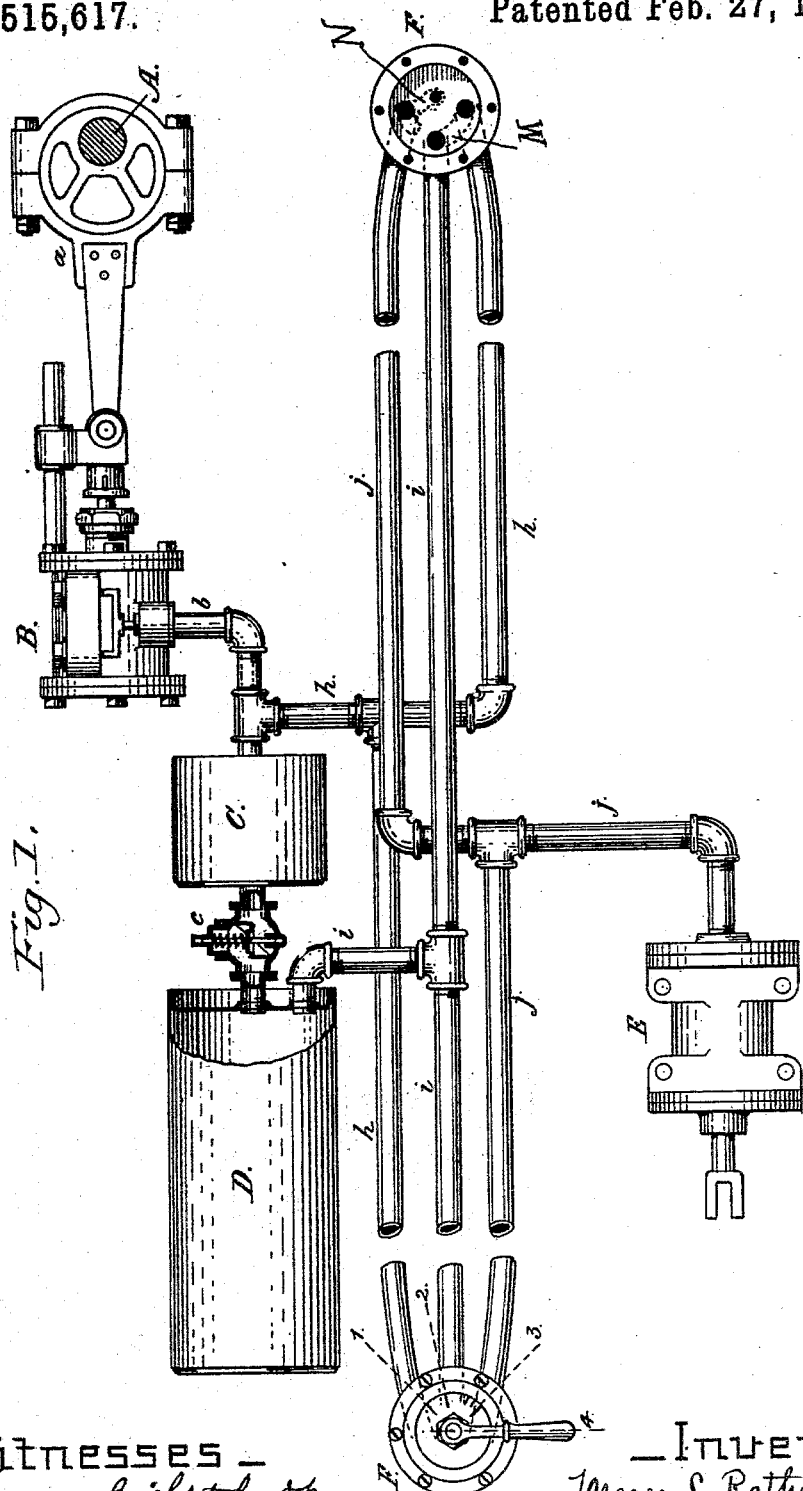
Figure 2:
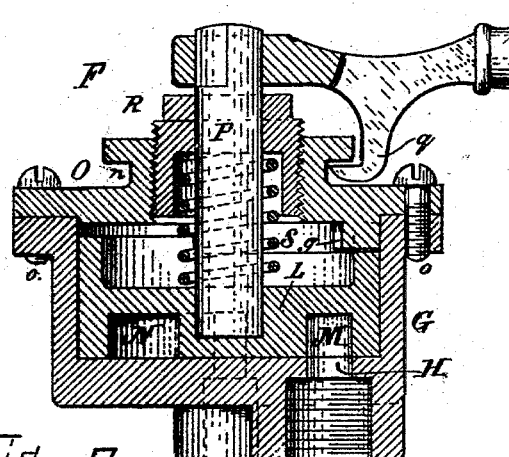
Figure 3:
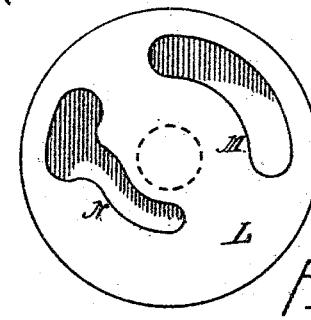
Figure 4:
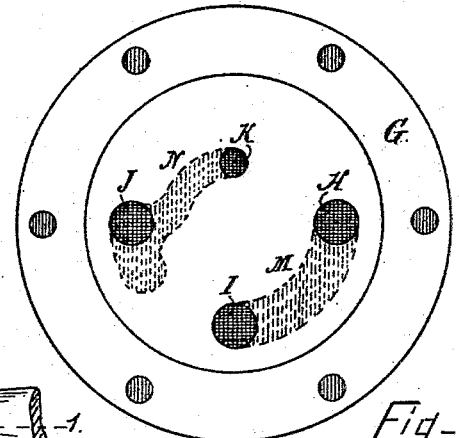
Figure 7:
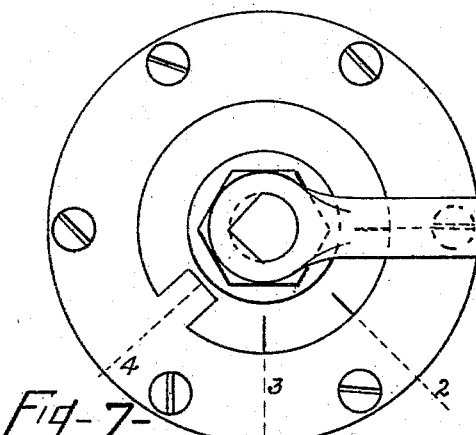
Figures 5, 6:
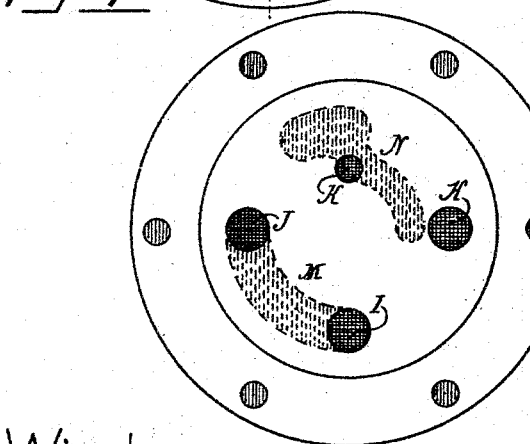

Figure 1 is a plan view of my improvement as applied to a car so that it may be operated from either end. Fig. 2 is a vertical section taken on dotted lines 1—4, Fig. 5. Fig. 3 is a bottom plan view of the rotating part of the valve. Figs. 4, 5 and 6 are top plan views of the stationary part of the valve, showing in dotted lines different positions of the rotating part of said valve, and Fig. 7 is a top plan view of the valve showing in dotted lines the different positions of the handle.

A represents the axle of the car; B represents an air compressor operated by an eccentric and connecting rod $a$, from said axle.

C represents a regulating reservoir, D a car reservoir for compressed air, E an air brake cylinder, $b$ a pipe connecting air compressor B with the regulating reservoir C, and $c$ a pipe with a weighted check valve connecting reservoirs C and D.

F represents a controlling valve, of which there may be only one on a car, but preferably there are two on a motor or grip car, one on each end of said car as shown in Fig. 1, the one at the upper end of Fig. 1 being shown with the cap removed for purposes of illustration. Valve F consists of a shell G through the seat of which are formed four ports H, I, J and K, and a rotary disk or plate L adapted to lie and rotate within shell G, in the under side of which are formed two grooves or recesses M and N. The ports H, I, and J, are in a circle around a central point, and the groove or recess N is so formed that it can only connect ports J and K, and cannot connect ports K and H. For the purpose of insuring quick connection between ports J and K, and retaining this connection as long as possible, I prefer to offset one end of groove or recess N as shown in the drawings, thus permitting the brake cylinder to exhaust freely and quickly.

O represents a cap adapted to be bolted to shell G by bolts $o$, and P represents a stem, one end of which is connected to valve disk or plate L, while the other end projects upward adapted to engage with a handle Q.

R represents a screw plug in cap O, and S represents a spiral spring encircling stem P, one end of which lies within screw plug R, while the other end presses against valve disk or plate L and holds it firmly in its seat against the air pressure in groove or recess M.

$n$ represents a groove in cap O, into which a projecting lug $q$ on handle Q fits and moves to steady said handle.

The pipe $b$ is connected by the branched pipes $h\ h$ with the port H in shell G, reservoir D is connected by the branched pipe $i$ with the port I in shell G. Brake cylinder E is connected by the branched pipes $j$ with the port J in shell G. Port K in shell G opens freely to the outer air.

As indicated by dotted lines in Figs. 4, 5, and 6, the valve may be turned as in Fig. 4 so that the groove or recess M connects ports H and I, and groove or recess N connects ports J and K, or as in Fig. 5, so that groove or recess M registers only with port I, recess N still connecting ports J and K, or as shown in Fig. 6, groove or recess M connects ports I and J, while groove or recess N registers only with port K, these positions being indicated by the dotted lines 1, 2 and 3, in Figs. 1 and 7. There is also a position beyond or between that of Fig. 6, marked 4 in Figs. 1 and 7, in which neither of the grooves or recesses M and N register with either of ports H or I, and in which no air can pass through valve F, thus rendering said valve inert.

The operation of my invention is as follows: The motion of the pump B compresses air into reservoirs C and D, and assuming the valve to be in the position 1, shown in Fig. 7, air passes from reservoir C to reservoir D through pipe $c$, when there is no pressure in reservoir D, or when the pressure therein is so small that the pressure in reservoir C opens the check valve in pipe $c$, or if pipe $c$ is entirely omitted, air passes through the branched pipes $h$ into the port H, thence through groove or recess M into port I and through branched pipe *i* into reservoir D until the pressure in reservoirs C and D becomes equal and rises to the point at which the air pressure will unseat the suction valves of compressor B in any known manner, when air will cease to flow through said pipes. When the grip-man desires to apply the brake, he moves handle Q from position 1 to position 2, which cuts off the connection through groove or recess M between ports H and I, thus preventing the escape of air from reservoir C. By continuing the motion of handle Q into the position shown in Fig. 6, he causes groove or recess M to connect ports I and J which throws reservoir D into connection with brake cylinder E through the pipe *i*, port I, groove or recess M, port J and branched pipe *j*, thus applying air to said brake cylinder and setting the brake in a manner so well understood that it needs no further description. When the car has been brought to rest the motion of the handle Q is reversed until the parts come into the position shown in Fig. 5, in which the port J is connected through branch pipe *j* and groove or recess N with exhaust port K, and the pressure on brake cylinder E is left off. In this position groove or recess M does not register with port H so that the pressure in reservoir C is maintained, and the air compressor B is held out of operation by the unseating of the suction valves, as is well known. After the car starts and attains proper headway, handle Q is turned back to the position 1, thus bringing the grooves or recesses in the position shown in Fig. 4, in which reservoirs C and D are again connected through pipes *h*, port H, groove or recess M, port I and pipe *i*, thus again equalizing the pressure in the two reservoirs. By the means described the air compressor is held out of operation in starting the car, and consequently all available power can be utilized when the car is being started. If when the valve is in the position shown in Fig. 5, another stop is to be made before sufficient headway is attained to render it advisable to again connect reservoirs C and D, the valve is again turned to the position shown in Fig. 6, drawing upon the supply of air contained in reservoir D without diminishing the pressure in reservoir C. The pipe *c* with its load or weighted check valve is simply to guard against the neglect of the grip-man to return the valve to the position shown in Fig. 4, as in such case when the pressure in reservoir D falls too low, the pressure in reservoir C will open the weighted valve and pipe *c* and permit air to flow from reservoir C into reservoir D. It is evident therefore that pipe *c* with its weighted check valve is not necessary and may be dispensed with. Whenever two valves F are used, as shown in Fig. 1, so that the grip-man may operate the brake from either end of the car, it is of course necessary that the inactive valve be left in the position 4, in which no two of the ports H, I, J and K are connected. For the purpose of facilitating placing the valve either in the positions 1 or 4, I form a lug *g* on the lower side of cap O to engage with a projection on valve L, and stop said valve in its rotation either way, at either the point 1 or the point 4.

I do not herein broadly claim the combination with an air compressor of the type whose operation is controlled by air pressure, of a regulating reservoir, a car reservoir, an air brake cylinder, and a valve mechanism, whereby the car reservoir may be connected either with the regulating reservoir or with the brake cylinder, as such constitutes the subject-matter of my application for patent, Serial No. 442,193, filed August 4, 1892.

What I claim as my invention, and desire to secure by Letters Patent, is -

The combination with an air compressor, a regulating reservoir, a car reservoir for compressed air, connections between said reservoirs, and an air brake cylinder, of a valve consisting of a shell having four ports formed in its bottom, the first connected with the air compressor and regulating reservoir, the second connected with the car reservoir, the third connected with the brake cylinder, and the fourth opening into the air, and a rotary disk or plate having the bottom surface provided with a series of grooves adapted to connect the second named port with either the first or third, and to connect the third port with the fourth, or to isolate all of said ports from each other, substantially as shown and described.

MOSES L. ROTHSCHILD.

Witnesses:
AUG. FLINN,
W. P. SHERMAN.